J. DILLANDER.
AIR BRAKE SYSTEM.
APPLICATION FILED SEPT. 23, 1908.
977,856.
Patented Dec. 6, 1910.
5 SHEETS—SHEET 4.
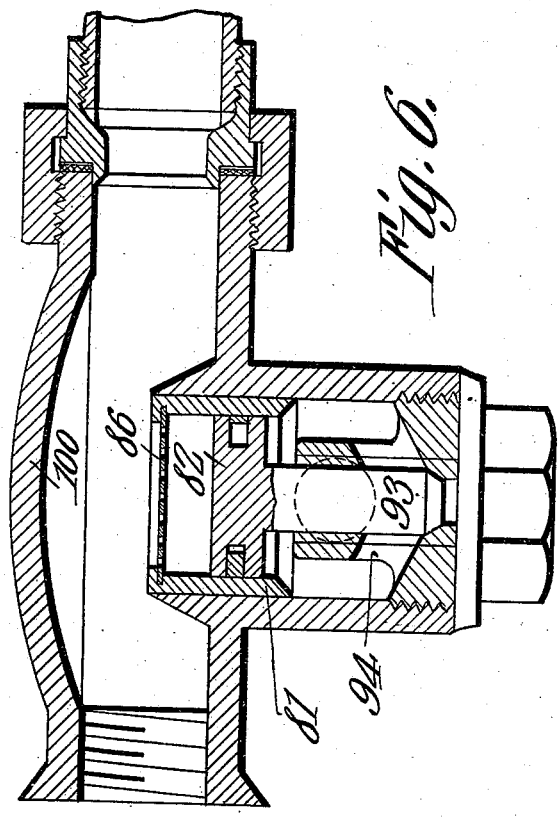
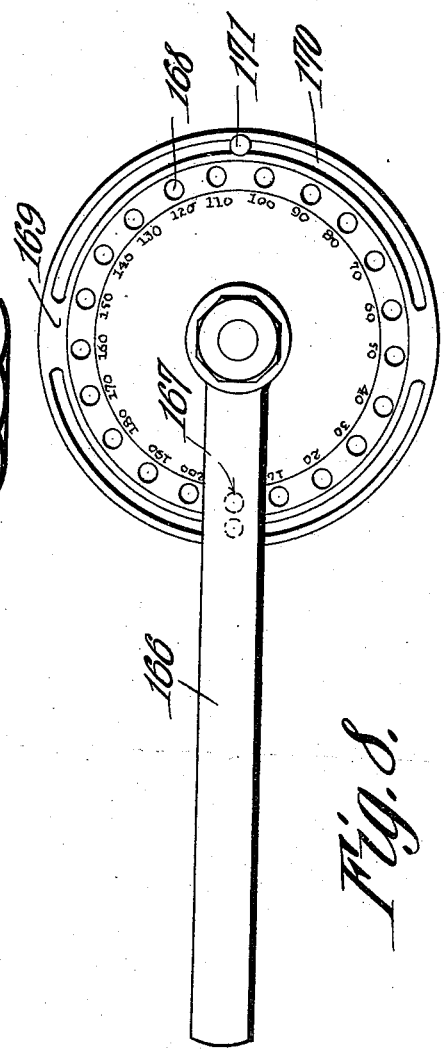
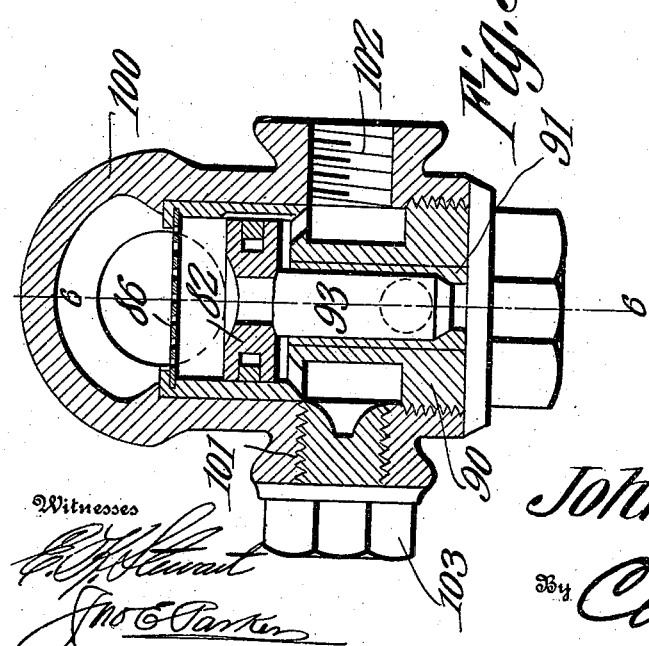
Inventor
John Dillander,
By C. A. Snow & Co.,
Attorneys
Witnesses J. DILLANDER.
AIR BRAKE SYSTEM.
APPLICATION FILED SEPT. 23, 1908.
977,856.
Patented Dec. 6, 1910.
5 SHEETS—SHEET 5.
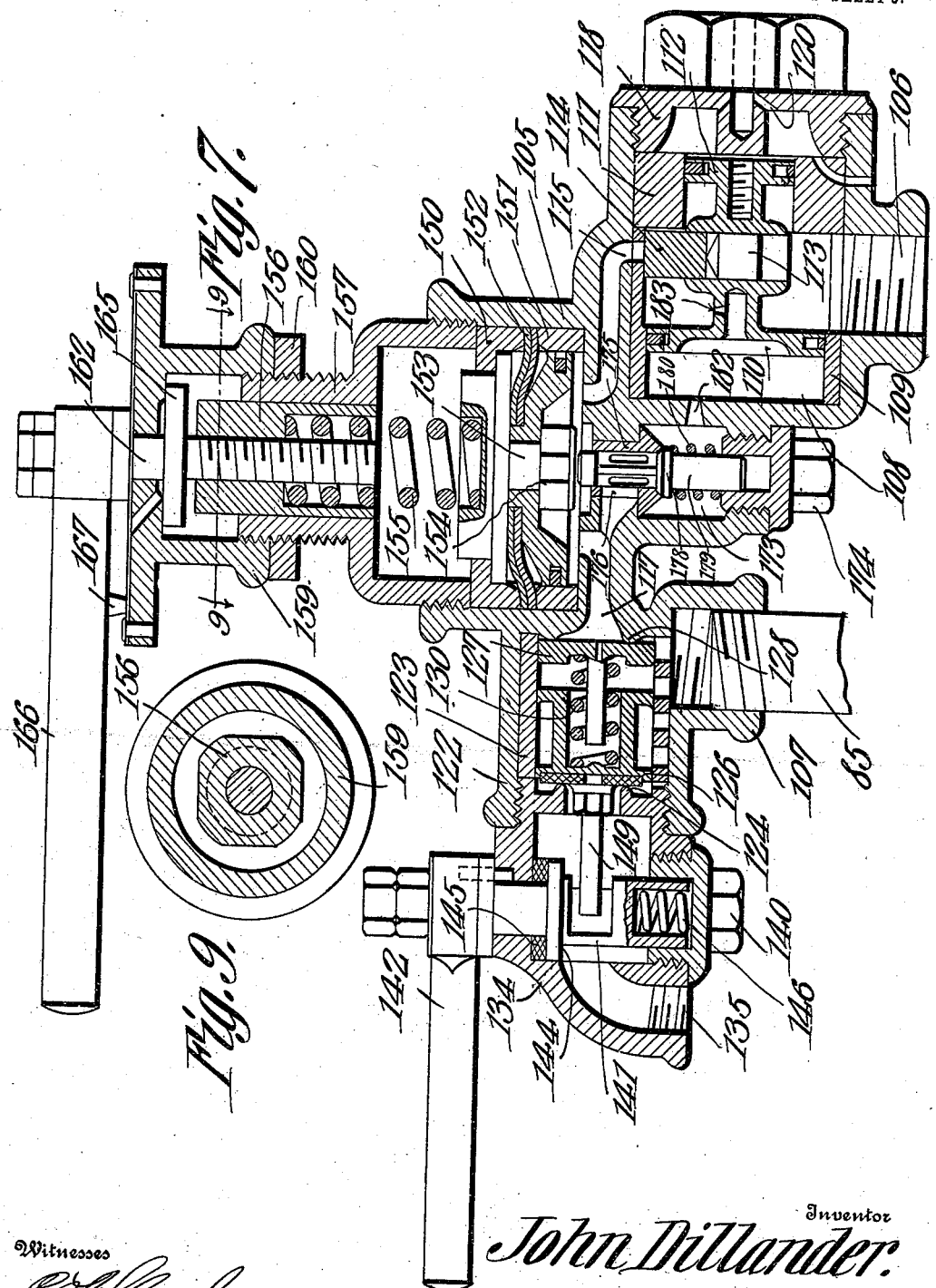
Witnesses
Inventor
John Dillander.
By C. A. Snow & Co.
Attorneys

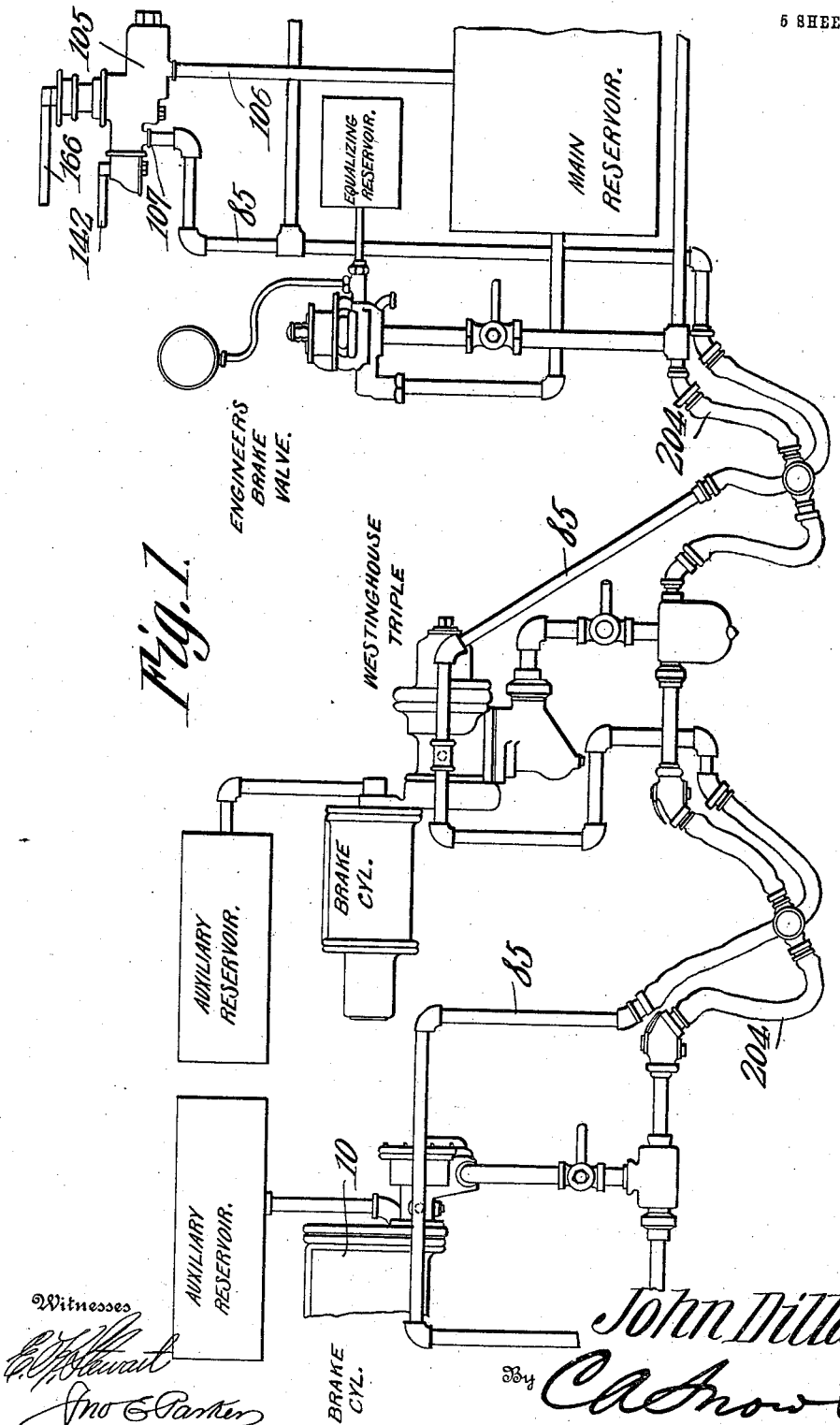

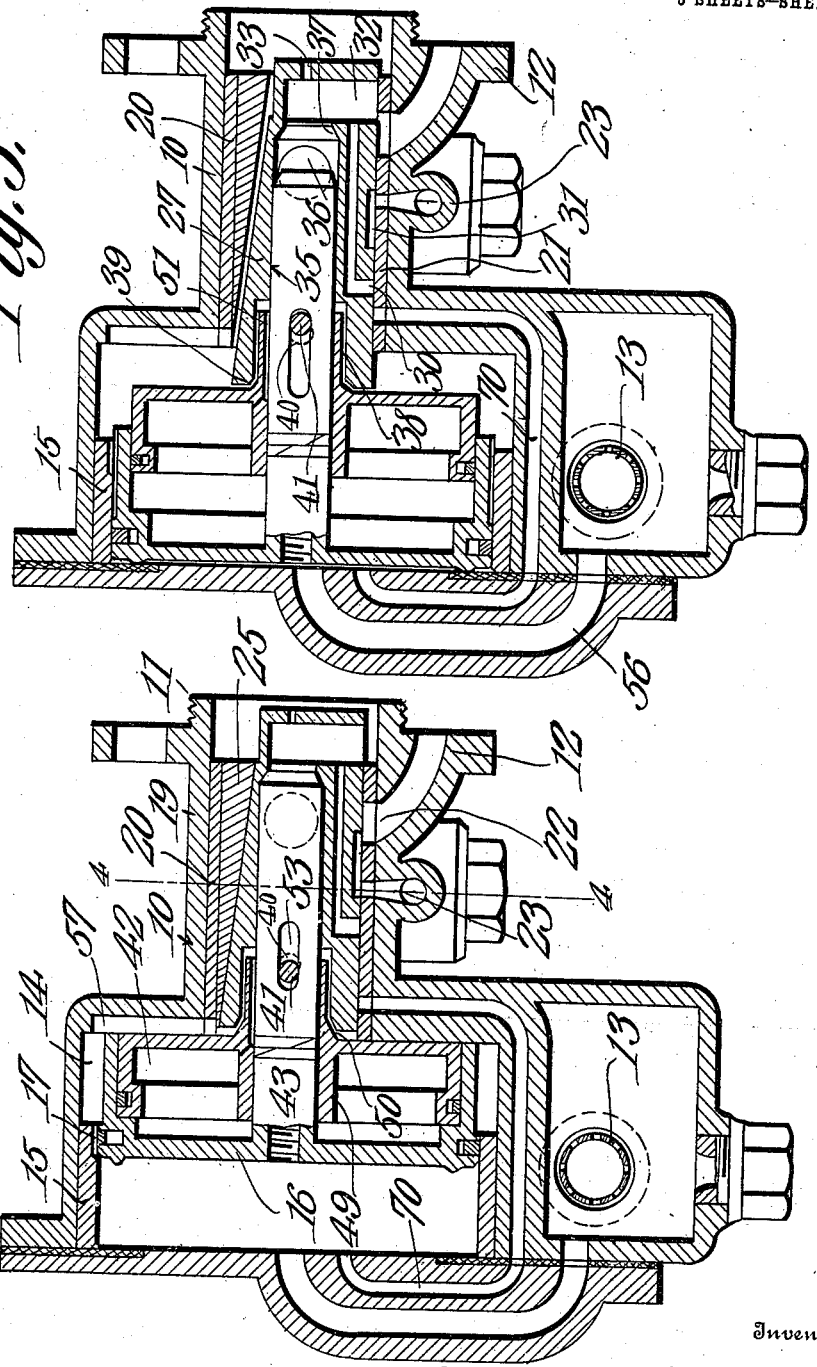

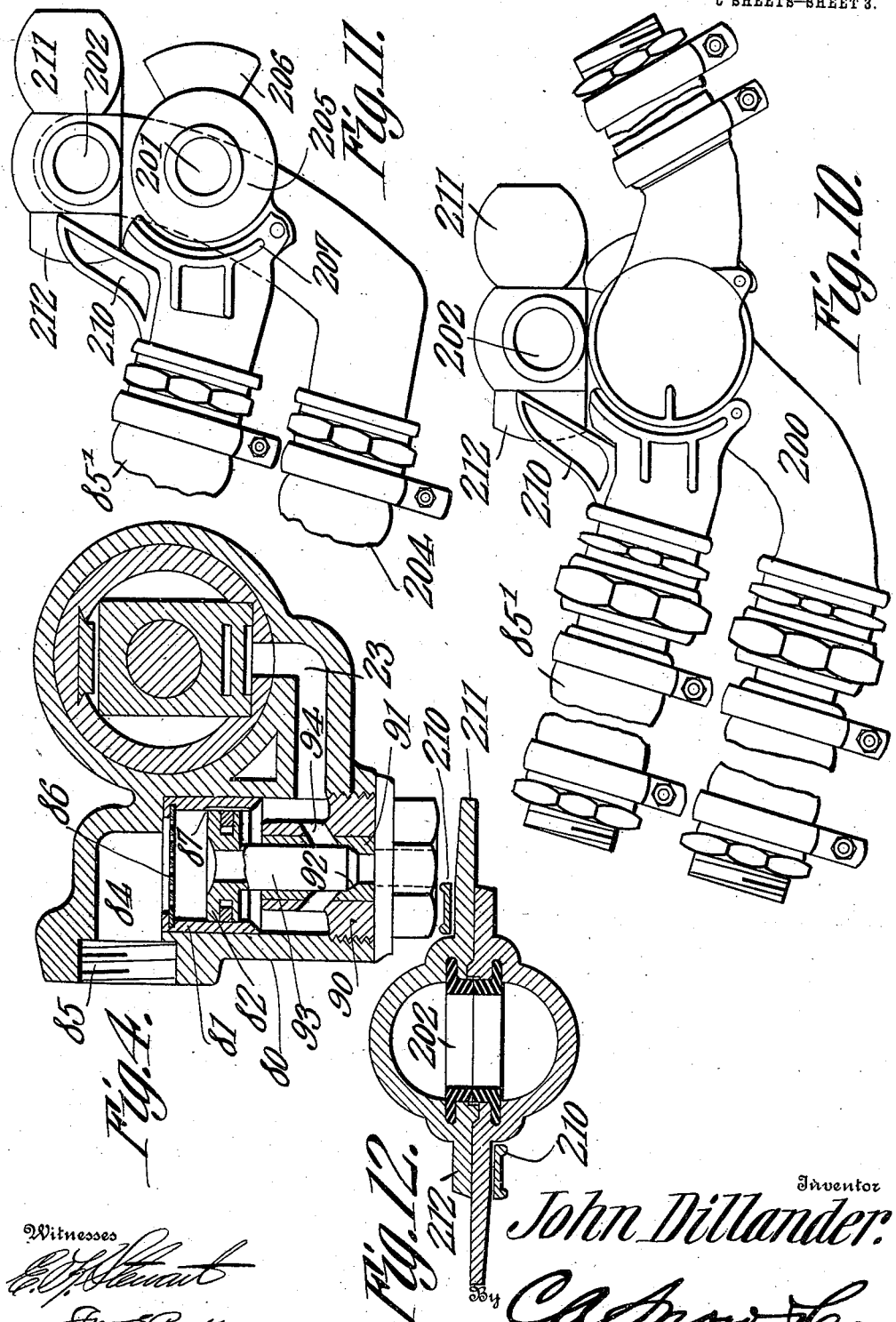

UNITED STATES PATENT OFFICE.

JOHN DILLANDER, OF TEMPLE, TEXAS.

AIR-BRAKE SYSTEM.

977,856. Specification of Letters Patent. Patented Dec. 6, 1910.

Application filed September 23, 1908. Serial No. 454,312.

*To all whom it may concern:*

Be it known that I, JOHN DILLANDER, a citizen of the United States, residing at Temple, in the county of Bell and State of Texas, have invented a new and useful Air-Brake System, of which the following is a specification.

This invention relates to air brake systems.

In the air brake systems in commercial use it is impossible to retain braking pressure in the brake cylinder while the auxiliary reservoir is being recharged, so that after one application of the brakes it is necessary to release and then wait until the auxiliary reservoirs are recharged before another application can be made. It is, furthermore, practically impossible to maintain a given pressure in the brake cylinder, and it is altogether impossible to graduate the pressure in the brake cylinder and place the pressure wholly under the control of the engineer.

It is the principal object of the present invention to overcome these objectionable features and to provide a braking system that is completely and wholly under the control of the engineer, and by which the engineer may admit air to the brake cylinder under any desired degree of pressure and maintain that pressure as long as he desires, or he may increase or decrease the pressure and maintain the increased or decreased pressure for any length of time, so that the train will be brought under full control and may be stopped slowly or abruptly.

A further object of the invention is to provide a system that will permit of the recharging of the auxiliary reservoirs while maintaining any given pressure in the cylinder, and, further, to permit of increase or decrease in the braking pressure in the cylinder after an application of the brakes, and before the release of such brakes.

A still further object of the invention is to provide a duplex system combining both automatic and straight air features, and so arranged as to be operable independently of each other, or to a certain extent simultaneously or successively, for the purpose of securing any desired braking effect.

A still further object of the invention is to provide a system that may be used in connection with the ordinary train equipment of Westinghouse or New York air brakes, using either plain or quick action triples, and by which said triples may be utilized as a part of a straight air system without in any manner detracting from or interfering with their ordinary use.

A still further object of the invention is to provide a system in which after the stoppage of a train it is unnecessary to wholly release the brake cylinder pressure before starting, so that a portion of the air will be retained in the brake cylinders at all times, and thus reduce the work of the pump.

A still further object of the invention is to provide a braking system which may be operated with the utmost efficiency on a much lower pressure than is now considered necessary, so that the work of the air pump will be materially reduced and the life of the air hose lengthened.

A still further object of the invention is to provide a novel form of automatic governor which may be placed on the engine for the purpose of controlling the pressure of air admitted to the brake cylinder under the straight air system.

A still further object of the invention is to provide for the employment of two separate lines of train pipe one for the automatic brake and the other for the straight air, and to provide for the connection of these by a single coupling between the train so as not to increase the work of the train crew in connecting up.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a view in the nature of a diagram showing a duplex system constructed and arranged in accordance with the invention, illustrating the manner in which ordinary plain triples, Westinghouse triples and New York triples may all be connected in the same system, together with a novel form of triple valve, the construction of which forms the subject of a separate application for Letters-Patent. Fig. 2 is a detail sectional view of the improved form of triple valve illustrating the connections. Fig. 3 is a similar view of the same, showing the parts in the position assumed immediately after the graduated or service reduction. Fig. 4 is a transverse sectional view on the line 4—4 of Fig. 2, showing the retaining valve. Fig. 5 is a transverse sectional view of a slightly modified arrangement of retaining valve to be used in connection with and applied to the ordinary Westinghouse or New York triple. Fig. 6 is a section on the line 6—6 of Fig. 5. Fig. 7 is a detail sectional view of the automatic governor used in the engine cab. Fig. 8 is a plan view of the dial of the automatic governor. Fig. 9 is a sectional plan view on the line 9—9 of Fig. 7. Figs. 10 and 11 are views of hose couplings. Fig. 12 is a cross section of a portion of the hose coupling.

Similar numerals of reference are employed to indicate corresponding parts throughout the several figures of the drawings.

Referring first to the construction of the triple valve, 10 indicates a casing provided with the usual auxiliary reservoir connection 11 and brake cylinder connection 12, and at the lower part of the main portion of the casing is a connection 13 for the train pipe.

The main body of the casing is bored out to form a cylinder 14 which contains a bushing 15, and in this bushing is mounted the main piston 16, the latter being arranged to uncover the feed groove 17 when in the full release position shown in Fig. 2, so that air may flow through to the auxiliary reservoir in the usual manner.

The rear portion of the casing is in the form of a cylinder 19 which contains a bushing 20. The lower portion of the bushing is grooved out, and faced to form a valve seat 21. In this valve seat are two ports 22 and 23, the port 22 leading to the brake cylinder, and the port 23 to the exhaust, or, in the present instance, to the retaining valve connection. This valve, as will be hereinafter described, is employed for the purpose of holding the pressure in the brake cylinder when the triple valve is in full release position. It is, also, utilized for the purpose of retaining within the cylinder any predetermined pressure of air, and for permitting alteration in the braking pressure.

The upper portion of the bushing 20 is provided with a dove-tailed groove for the reception of a correspondingly shaped wedge block 25 that is adapted to form a stop to prevent excessive inward movement of the main valve 27.

The valve 27 is in the form of a generally rectangular block, the upper face of which is inclined to correspond to the inclination of the lower face of the wedge block 25, and in the lower portion of this valve are three ports, 30, 31 and 32, the port 31 being in the form of a cavity through which the brake cylinder may exhaust to the port 23, while the ports 30 and 32 are in communication with each other and are utilized in the operation of the device as hereinafter described. The larger port 32 opens at the bottom of the valve and the rear wall of said port is provided with a small opening or port 33 through which auxiliary reservoir pressure may pass on both service and emergency reductions. The valve is further provided with a longitudinal bore 35 which communicates through lateral ports 36 with the open space at the sides of the valve. At the inner end of the bore is a tapered seat 37, and at the opposite or outer end the bore is enlarged, as indicated at 38, and terminates in a tapered seat 39 which acts as a valve seat in several positions of the valve. The opposite sides of the valve are further provided with short horizontal slots 40 for the passage of a transverse pin 41.

The rear side of the main piston is hollow and is bored out for the reception of an equalizing piston 42 that is free to slide within the main piston. The equalizing piston is, also, guided by a stem 43 projecting rearward from the main piston, and having a tapered end portion that is arranged to engage against the tapered seat 37 at the inner end of the bore 35.

The equalizing piston 42 is provided with a hub 49 that projects rearwardly in the direction of the auxiliary reservoir and enters the enlarged portion 38 of the valve bore, but the diameter of the hub is less than the diameter of the enlarged portion 38, so that the compressed air may freely pass between the two. At the point where the hub joins the equalizing piston, the base of such hub is tapered to form a valve 50 that is arranged to engage against the valve seat 39 and extending partly through the hub is a port 51 communicating at one end with the space between the two pistons and opening at the opposite end at the extreme end of the hub.

The hub carries the pin 41, which, as before stated, extends through the short slot 40, and the pin, also, passes through an elongated horizontal slot 53 that is formed in the stem 43.

When the parts are in the position shown in Fig. 2, train pipe pressure entering at 13 passes up through the passage 56 to the cylinder 14, and operates on the main piston, tending to thrust all of the parts to the right and retain the same in the position shown in Fig. 2. The air feeds through the leakage groove 17 and thence down the radial groove 57, passing through the casing on opposite sides of the valve to the auxiliary reservoir, and a portion of the air also passes down between the hub of the equalizing piston and the wall of the portion 38 of the bore to the groove 51 and into the space between the two pistons so that the latter becomes filled with air under auxiliary reservoir pressure.

To apply the brakes gently, or secure what is known as graduated or service application, the engineer reduces the train pipe pressure by opening the engineer's brake valve. The train pipe pressure being weakened in the cylinder 14 causes the auxiliary reservoir pressure to start all of the parts moving to the left. The frictional resistance of the slide valve will cause pistons 16 and 42 to separate, as shown in Fig. 3. The main piston continues its stroke and makes the full stroke against the packing ring 60. The parts are all carried to the left and port 32 is placed in communication with the port 22 leading to the brake cylinder, while the stem 43 opens the side ports 36, so that air may flow in through the side ports and the bore of the valve to the port 32, and a small quantity of air will also enter through the port 33. This air passes to the brake cylinder and applies the brakes gently.

It will be noted on reference to Fig. 2 that when the parts are in full release position, the pin 41 is at the outer or left hand end of the slot 40 of the valve and near the left hand end of the long slot 53 of the stem, so that as the equalizing piston moves to the left with the main piston, the pin will operate against the left hand end wall of the slots 40 and pull the valve over to the position shown in Fig. 3, while the elongated slot 53 permits traveling of the main piston to the limit of its stroke without working engagement between the end of the long slot and the pin.

When the auxiliary reservoir air has passed into the brake cylinder to the amount of the train pipe reduction, the engineer's valve is placed in lap position and the weakened train pipe pressure forces the piston over until the equalizing piston strikes against the rear wall of the cylinder. The valve then stands in what is known as lap position with all of the ports blank. In this position the space between the two pistons being filled with air under full auxiliary reservoir pressure prevents the main piston from moving to the right and consequently assuming release position. The air between the two pistons cannot now escape for the reason that the valve 50 at the end of the hub has moved into contact with the valve seat 39, so that the port 51 is closed. The weakened train pipe pressure cannot compress the higher auxiliary reservoir pressure between the two pistons, so that it is impossible to move the pistons close together, and, therefore, move the valve to release position, this being accomplished only by raising the train pipe pressure by placing the engineer's brake valve on full release or on running position. This feature of construction is of importance in that it eliminates all auxiliary springs or stops, and at the same time positively prevents accidental movement of the valve from lap to release position.

Should the engineer wish to release the brake from lap position, he does so in the usual way by increasing the train pipe pressure, and the parts will then assume the running position shown in Fig. 2, permitting recharging of the auxiliary reservoir in the usual manner.

If the engineer wishes to apply the brakes in emergency, a very quick and heavy train pipe reduction is made by proper movement of the engineer's brake valve. The train pipe pressure is suddenly weakened in the cylinder 14, and the high auxiliary reservoir pressure suddenly acts on the main and equalizing pistons, forcing both of them to the left, the main piston making its full stroke as before. The reduction in train pipe pressure is so great and the movement of the piston is so quick that there is no opportunity for the escape of the high pressure air from the space between the two pistons, and both pistons will move as a unit and the valve will be carried back a much greater distance than in the graduated or service reduction in order to allow the air to flow from the train pipe through passage 56 to the cylinder 14, thence through passage 70 to the port 30 and port 32 to port 22 and brake cylinder. As soon as the auxiliary reservoir pressure can feed through the small port 33 and reduce below the high pressure in the space between the two pistons, this body of air under pressure will force the equalizing piston to the right, moving the slide valve in such manner as to cut off the port 70 and stop the further flow of air from the train pipe, while allowing the auxiliary reservoir pressure to continue to flow through the ports 36, bore 35, and port 32 to the brake cylinder.

It will be noticed that this operation is accomplished, that is to say, the reduction of train pipe pressure to quicken the action of the next brake, and the application of the auxiliary reservoir air in both graduated and emergency applications, also, the equalizing of the train pipe pressure with the brake cylinder, by means of the single slide valve, there being no auxiliary valve either slide or check, and no stopping or cushioning springs or other devices to limit the movement of the parts.

At one side of the main valve casing, and preferably formed integral therewith is a cylinder 80 having a bushing 81 in which is mounted a piston 82. The upper end of the casing communicates through a lateral port 84 with a pipe 85 leading to the engine, and through which air under any predetermined pressure may be forced. A small strainer 86 is preferably introduced at the top of the bushing to prevent the entrance of dirt, and at the side of the bushing is formed a small leakage groove 87. The lower end of the cylinder communicates with the port 23 constituting the exhaust of the triple valve, so that the piston 82 will be raised by the pressure of air escaping from the brake cylinder, and will be forced downward by the pressure of air entering through the pipe 85, as well as by its own weight.

The lower end of the cylinder is threaded and receives a plug 90. This plug is centrally bored and provided with a bushing 91 in which is formed a tapered valve seat 92 for the reception of a valve stem 93 that is carried by the piston 82. The bore of the bushing communicates with the interior of the cylinder through lateral ports 94.

If there is no pressure in the pipe 85, the exhaust passing from the brake cylinder to the port 23 will raise the piston 82 and the air will escape through the ports 94 and the bore of the plug 90 to the outer air, thus releasing the brakes, but if the engineer wishes to retain the brake cylinder pressure he forces air through the pipe 85 so as to hold the piston down and thus prevent the escape of air from the brake cylinder even after the triple valve has been moved to release position. This is of importance in that it permits the holding of the braking pressure while the auxiliary reservoir is being recharged in the ordinary manner, although it requires an extra pipe 85 leading throughout the train and provided with suitable means under the control of the engineer for connecting it to a suitable source of air supply.

Should the engineer wish to increase the pressure in the brake cylinder over and beyond the initial braking pressure he may force air under high pressure through the pipe 85 and this air will keep the piston 82 down and will feed through the groove 87 into the lower portion of the cylinder, and thence through the port 23, the port 31 of the slide valve, and down through the port 22 to the brake cylinder, so that, if desired, pressure may be maintained in the brake cylinder for any period of time, and the operation will be wholly independent of the automatic braking system, while the pressure of the latter may be held in reserve with the auxiliary reservoir charged and ready for use. Provision is, also, made for slightly reducing the pressure in pipe 85 in case the braking power is in excess of that required, so that the air passing from the brake cylinder will slightly raise the piston 82 and partly open the valve to permit the escape of a portion of the pressure within the brake cylinder.

The construction just described, and as shown in Fig. 4, is used where the improved form of triple is employed, but where the ordinary Westinghouse or New York triple valves are to be employed in the same system, a slightly different construction shown in Figs. 5 and 6 is adopted. In this case the retainer is made in the form of a separate member which may be attached in the auxiliary straight air pipe 85 and connected to the port of the triple valve. The casing 100 of the modified construction of retainer is approximately in the form of a T-joint, which may be coupled into the pipe 85 and at the opposite sides of the lower portion of the casing are threaded openings 101, either of which may be connected by a short pipe 102 to the exhaust port of the ordinary triple valve, while the opposite opening is closed by a plug 103. This permits of the application of the retainer to either side of the triple valve and facilitates connection of the parts. The operation, however, is precisely the same as previously described.

The automatic governor which is placed in the cab of the engine is entirely independent of the engineer's brake valve, and may be operated independently or in conjunction with said valve. Its function is to control connection between the main reservoir or other suitable source of air pressure supply and the pipe 85 and its construction is such as to automatically regulate the pressure sent through the pipe 85 to the brake cylinder, it being possible for the engineer by setting the governor to retain any desired pressure in the cylinders.

The main casing 105 is connected at 106 to the main reservoir on the locomotive, and at 107 is connected to the straight air pipe 85. At the lower right hand side of the casing is a cylinder 108 having a bushing 109 in which fits a piston 110. The cylinder also contains a bushing 111 in which slides a piston 112, the two pistons 110 and 112 being permanently connected together by a stem 113 which carries a valve 114 controlling a port 115. The air entering at 106 from the main reservoir operates on both pistons, but as the piston 110 is of much greater area than the piston 112, the two pistons will be carried to the left and the valve 114 will be moved to open position, allowing the air to flow through the port 115 from whence it passes in a rather indirect path to a port 117 and thence through the connection 107 to the straight air pipe 85. The outer end of the cylinder 108 is closed by a plug 118 and ports 120 are provided through the plug for the purpose of allowing the free flow of atmospheric air into and from the outer end of the cylinder, so that the outer face of the small piston 112 is exposed only to the normal or atmospheric pressure.

At the left hand side of the main casing is a cylinder 122 containing a perforated bushing 123, and at the opposite end portions of the bushing are valve seats 124 and 128 which are engaged by a pair of check valves 126 and 127, said valves being normally pressed in the directions of their seats by a pair of compression springs 130. The resistance of these springs must be overcome by the air pressure passing from port 117 to the pipe 85, and this may be readily accomplished, the spring being a comparatively light one, so that air may be allowed to flow from the automatic governor to said pipe 85. At the extreme outer end of the cylinder 122 is arranged a small casing 134 having an exhaust port 135, and the opposite end of the casing has a threaded nipple which screws into the threaded end of the cylinder 122 and serves partly as a means for holding the bushing 123 in position within the cylinder, while the seat 124 is formed on an annular flange extending inward from the wall of the casing.

The lower portion of the wall of casing 134 has a threaded opening for the reception of a plug 140 that is provided with a central recess for the reception of the lower end of a cylindrical stem 141 that passes up through an opening formed in the casing and is provided with a suitable operating handle 142. This stem is provided with a flange or collar 144 that is forced against a packing ring 145 by means of a coiled compression spring 146 seated in a recess at the bottom of the stem, this construction serving partly for the purpose of preventing leakage.

The stem 141 is partly cut away at one side to form a flat face. This flat face of the stem is arranged to engage a valve operating rod 149 carried by the valve 126 and by turning the stem, the flat face of the latter may be forced against the end of the rod, thereby moving the latter in the direction of its length and opening the valve slightly for the purpose of allowing pressure to exhaust from the straight air pipe 85 through to the main exhaust port 135.

In the upper central portion of the casing 105 is a cylindrical chamber containing two bushings 150 and 151 between which is clamped the outer edge of a yieldable diaphragm 152. This diaphragm is carried by a two part piston 153, the upper section of which is guided within the bushing 150, while the lower section is guided within the bushing 151, and the two parts of the piston are permanently secured together by a nut 154. The top of the upper section of the piston 153 is recessed to receive the lower end of a spring 155, the upper end of said spring being housed in a recess formed in the lower face of a vertically movable nut 156 that is guided in an opening formed in the reduced neck of the upper section 157 of the cylinder.

The periphery of the neck is threaded for the reception of a cap piece 159 which may be screwed down into place and locked by a nut 160.

The central portion of the cap 159 is provided with an opening for the passage of a stem 162, the lower portion of which has a quick pitch screw thread 162 fitting the threads of the nut 156. Near the upper portion of the stem is an enlarged flange 165 that bears against the inner face of the cap and receives the thrust of the nut, and the spring 155.

To the extreme upper end of the stem 162 is secured an operating handle 166 having a detent 167 which may be readily shifted, and allowed to remain in any one of a series of shallow depressions 168 that are formed in an indicating disk 169 adjustably secured to the top of the cap.

The disk is provided with a series of depressions 168 and opposite each is a mark indicating the pressure sent from the main reservoir through pipe 85 to the brake cylinder. In the present instance any pressure from ten pounds to two hundred may be thus transmitted. The indicating disk is provided with two long arcuate slots 170 for the passage of a pair of securing screws 171. This is for the purpose of permitting adjustment of the indicating disk to the zero point of the spring, and is of considerable importance in that it thereby avoids the necessity of employing springs of precisely the same length and capacity. In other words, it is merely necessary to introduce a spring of approximately the right length and strength and then turn the handle 166 until the spring begins to resist further movement of the nut 156. The indicating disk is then turned until the zero mark is under the handle and said disk is then locked in place. This construction provides also for such adjustment as may be necessary to compensate for fatigue in the spring.

Arranged in axial alinement with and below the diaphragm 152 is a chamber 173, the lower end of which is closed by a plug 174. At the top of the chamber is a bushing 175 through which extends a port 176, in communication with the port 117, and at the base of the bushing is a seat for a valve 178 that is carried by a vertically movable stem 179 normally forced upward by a spring 180. The upper end of the valve stem is arranged immediately below the nut 154, and on downward movement of the latter the valve will be forced away from its seat so as to place the chamber 173 in communication with the port 117.

The chamber 173 is in communication with the left hand end of the cylinder 109 through a small port 182 and this end of the cylinder is in communication with the second portion of said cylinder through a small port 183, so that under all circumstances the main reservoir pressure may flow through the port 183 and 182 to the left hand end of the cylinder, and the chamber 173 and as the area of the piston 110 exposed to pressure at the left hand end of the cylinder is greater than the area exposed to pressure at the opposite side, the piston will always be moved to position to maintain the valve 114 in closed position.

If the engineer desires to send twenty pounds pressure to the different brake cylinders, he turns the handle 166 until it is opposite the indicating mark 20 on the disk. This forces down the nut 156 and the movement is transmitted through the spring 155 to the piston and diaphragm, forcing the latter downward and nut 154 engages the stem 179 of the valve 178, thereby forcing the latter to open position and allowing the air to exhaust from the left hand end of the cylinder 109 through the port 182 to chamber 173, and port 176 to port 117, opening the check valve 127 and passing through the connection 107 to the pipe 85. The superior pressure from the main reservoir then acting on the right hand face of the piston 110 will force the latter to the left, moving the valve 114 to open position and allowing free passage of the main reservoir air through the port 115 and port 117 to the connection 85, the pressure being reduced at the check valve 127. The flow continues until the whole of the pipe 85 and all of the brake cylinders have been filled with air under twenty pounds pressure, and then this same pressure acting below the piston 153 will counter-balance the action of the spring 155 and compress the same to the extent of twenty pounds, thereby raising the piston and the nut 154 clear of the upper end of the stem 179, so that the valve 178 is free to close and prevent further passage of air from the left hand end of the cylinder 109. The main reservoir pressure will then continue to flow through the ports 183 and 182 until the pressure at the left of the piston 110 is sufficient to force it back to the closed position and the parts will then reassume normal position, while retaining twenty pounds pressure in the straight air pipe 85 and in the brake cylinder. Should the engineer desire to increase this pressure he moves the handle 166 to the desired point, for instance, until it is opposite the thirty, forty, fifty, or other mark, and thus forces the piston and diaphragm 152 downward until the valve 178 is again moved to open position and the same operation takes place until the back pressure in the straight air pipe equals the resistance offered by the spring and moves the spring upward for the purpose of permitting closing movement of the valve 178. In either instance the reduction of pressure at the brake cylinder or cylinders through any leakage in the train pipes will reduce the pressure that is acting to compress the spring 155, and the spring in expanding will again open the valve 178, so that sufficient air will pass through from the main reservoir to supply that lost by leakage, so that this pressure may be maintained in the brake cylinders automatically and without regard to any leakage at the hose or other connections.

With a construction of this kind it is possible for the engineer in traveling down grade to maintain any desired degree of pressure in the brake cylinder independently of the automatic brake, and if the motion of the train is not checked quickly enough he may increase the pressure, or if the stoppage is too abrupt he may release the pressure by turning the handle 142. Aside from this, when the train has been brought to a full stop, it is not absolutely necessary to empty the brake cylinder before starting a second time. By manipulating the handle 142, the pressure in the several cylinders may be gradually reduced until the train starts and some pressure may still be maintained in the brake cylinders so that all of the air is not lost and work of the pump is thus materially reduced. It is possible, furthermore, to secure adequate braking effect by long continued application of air under comparatively slight pressure without the necessity of carrying the extremely high pressure, such as is now considered necessary on passenger service, these high pressures being very dangerous owing to the liability of bursting of the hose connections and consequent application of the brakes while the train is running at full speed.

In general practice, it is usually found desirable to make either a service or emergency application by means of the automatic braking mechanism and after this has been made and the movement of the train partially checked, the automatic governor is set to retain the pressure which the engineer desires to hold in the brake cylinders. The engineer may then move the usual engineer's brake valve to release or running position and bring the triple valve to such position as to exhaust the brake cylinder. In exhausting, however, the air will pass under the piston of the retaining valve and will tend to raise the same, but will meet the pressure previously sent through the pipe 85 and which is then acting on the upper side of the piston of the retaining valve. If the brake cylinder pressure is superior the piston will be raised and brake cylinder air will escape to the atmosphere until the pressures are balanced, while the pressure in the brake cylinder will then remain exactly that which was sent by the engineer through the pipe 85, or if the engineer wishes to maintain a braking pressure greater than that which was in the brake cylinders, this greater pressure operating on top of the pistons of the retaining valve will hold the same down and the pressure will feed through the leakage ports around said pistons and enter the brake cylinder in the manner previously described in order to increase the brake cylinder pressure to the required point.

In order to avoid the necessity of providing separate couplings for the main train pipe and the additional straight air pipe employed in this system, a duplex coupling is used, and this coupling is of such construction that both pipes may be coupled at the same time or it may be utilized in connection with the ordinary single train hose coupling now in ordinary use.

Each coupling comprises a casting 200 having a pair of terminal ports 201 and 202 which are entirely independent of each other and are in communication with the auxiliary straight air hose 85′ and the train pipe hose 204, and at each port are arranged the usual yieldable gaskets 205 in order to prevent leakage. At a point adjacent the port 202 the casting is provided with a wing 206 and an arm 207, the latter being arranged to receive the wing 206 of a mating coupling member so that at this point connection may be made with the ordinary train pipe hose in case the train is made up of cars having the ordinary equipment and other cars having the improved equipment. In addition to these coupling members, a tongue 210 projects upward from each of the members 207 and arranged adjacent the port 202 are oppositely directed plates 211, 212, the plate 212 of one coupling being arranged to enter between the tongue 210 and plate 211 of the opposite member, so that both couplings may be connected at a single movement, and the work of the train crew will not be increased by the addition of the straight air pipe.

The engineer's valve herein shown and described forms the subject matter of another application Serial No. 454,314 filed by me on September 23, 1908, and the triple valve herein shown forms, in part, the subject matter of Letters Patent No. 930,649 granted August 10, 1909 on an application filed by me.

What is claimed is:—

1. In combination with automatic air brakes, a straight air train pipe connected with the exhaust ports of the triple valves of the automatic air brake system, an adjustable pressure determining valve for charging the straight air train pipe, and a manually operable valve at all times accessible to the engineer for opening the said train pipe to the atmosphere at will.

2. The combination with an automatic air brake system, of a straight air train pipe connected to the exhaust ports of the triple valves of the automatic air brake system, and a regulating valve and an exhaust valve for the straight air pipe both at all times accessible to and manually operable by the engineer.

3. The combination with an automatic air brake system, of a straight air train pipe connected to the exhaust ports of the triple valves of the automatic air brake system, a free valve between the exhaust port of each triple valve and the straight air train pipe movable by exhaust pressure from the triple valve to open the exhaust port of said triple valve to the atmosphere and by pressure in the straight air pipe to close the atmospheric connection and in the last named position opening the straight air train pipe to the brake cylinder through the exhaust port of the triple valve, a pressure determining valve for the straight air train pipe at all times under the control of the engineer, and an exhaust valve for the straight air train pipe also at all times under the control of the engineer.

In testimony that I claim the foregoing as my own, I have hereto affixed my signature in the presence of two witnesses.

JOHN DILLANDER.

Witnesses:
  CHAS. C. JONES,
  F. L. DENISON.